United States Patent Office 3,789,021
Patented Jan. 29, 1974

---

3,789,021
CATALYST FOR THE PRODUCTION OF CYANURIC CHLORIDE
Yelagondahally S. Suryanarayana and Luther J. Reid, Jr., Mobile, Ala., assignors to Ciba-Geigy Corporation, Ardsley, N.Y.
No Drawing. Original application May 11, 1971, Ser. No. 142,358, now Patent No. 3,707,544. Divided and this application Oct. 16, 1972, Ser. No. 298,175
Int. Cl. B01j *11/06*
U.S. Cl. 252—446                    3 Claims

ABSTRACT OF THE DISCLOSURE

An improvement is provided in a catalytic method for the production of cyanuric chloride from cyanogen chloride wherein the durability or life of the carbon catalyst is increased by mixing the active carbon catalyst with an intimate mixture of solid diluent, that is, an inert material or a catalyst with significantly less activity than the active carbon catalyst. Such a mixture when used in the vapor phase conversion of cyanogen chloride to cyanuric chloride has a much lower operating temperature with the result that the life of the active carbon catalyst is considerably increased.

---

This is a division of application Ser. No. 142,358, filed on May 11, 1971, and now Pat. No. 3,707,544.

STATEMENT OF INVENTION

The present invention relates to a novel method and more particularly, to a method for increasing the life or durability of an activated carbon catalyst used in converting cyanogen chloride to cyanuric chloride. This method combines or mixes with the active carbon catalyst, a solid diluent, i.e., an essentially inert material or a catalyst with significantly less activity than the activated carbon catalyst. The resulting catalyst generates a much lower overall temperature when used in the conversion of cyanogen chloride to cyanuric chloride. In view of the lower operating temperature, the catalyst combination has a much longer useful life and the life of the active carbon catalyst is at least doubled. In addition, quite unexpectedly, it was found that there is no loss in yield in the conversion of cyanogen chloride to the desired cyanuric chloride final product and yields of 97–98% are obtained employing the carbon catalyst-diluent composition of the present disclosure.

DESCRIPTION OF THE PRIOR ART

It is well known in the art that cyanuric chloride is prepared from cyanogen chloride in the presence of chlorine employing the vapor phase conversion method by use of carbon or a carbon containing material such as charcoal, as a catalyst. The conditions of trimerization are well known in the art and these conditions per se do not form a portion of the present invention. The reaction product cyanuric chloride is an important chemical compound which is used in the manufacture of many industrial products such as, for example, resins, rubber, explosives, herbicides, dyes, fluorescent brighteners and other materials.

It is highly desirable to have a continuous procedure wherein the activated carbon catalyst can be used without regeneration or without the need of a fresh charge of the catalyst for an extended period of time since, if the process has to be stopped in order to regenerate the catalyst or fresh catalyst has to be added, this adds to the cost of manufacture of cyanuric chloride. One of the many difficulties involved in maintaining a long life of the catalyst is that in a typical reaction for the catalytic conversion of cyanogen chloride in the vapor phase, the catalyst generates elevated temperature as well as "hot spots" that is, local spots having a temperature which is higher than the remainder of the reaction temperature. As a result of this elevated temperature and "hot spots," the catalytic activity is decreased and thereby the useful life of the catalyst is shortened. Additionally, it is believed the presence of "hot spots" in the catalyst increases undesirable by-products in the trimerization of cyanogen chloride to cyanuric chloride.

DETAILED DESCRIPTION OF THE INVENTION

The desirable catalytic activity of an active carbon catalyst is maintained for extensive time periods by employing a carbon catalyst having a high efficiency in the catalytic trimerization of cyanogen chloride and a substance, a solid diluent, having a lower or negligible effect on the trimerization of the cyanogen chloride.

The trimerization of cyanogen chloride takes place in accordance with the following reaction:

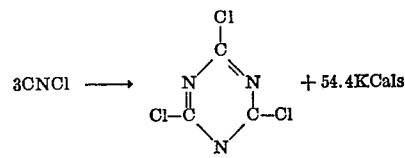

Initially it is necessary to define the efficiency of the carbon catalyst or diluent in the trimerization process. The activity of the carbon catalyst as employed herein is defined as the weight of cyanogen chloride trimerized per hour at 70% conversion per unit weight of the catalyst composition. This activity may be expressed as $F/W\ hr.^{-1}$ wherein F represents the weight of cyanogen chloride trimerized at a 70% conversion while W represents the weight of the catalyst composition. The term $hr.^{-1}$ represents the time duration represented on an hour's basis.

Although commercial efficiencies much greater than 70% in the trimerization technique are obtained such as 97–98%, the level of 70% conversion is utilized since this value allows higher accuracy in comparative tests particularly since the activity expressed in $F/W\ hr.^{-1}$ is dependent upon a time factor.

In the present disclosure an activated carbon catalyst is defined to denate a catalyst to have a minimum activity of 3.1. Carbon catalysts in the present context possessing a minimum activity below this level are considered too slow and too sluggish to efficiently catalyze the trimerization of the cyanogen chloride. Yet with these activity levels, it has been discovered that high temperatures with hot spots formation is a serious problem particularly in view of catalyst life.

This disclosure cures the elevated temperature and hot spot problem by employing a diluent material with a catalytic activity from 0 to about 2.5 at 70% efficiency in trimerization of cyanogen chloride. A diluent material may encompass essentially inert materials that do not function as a catalyst but rather serve to separate the active carbon catalyst. Additionally, a diluent material having an activity as high as 2.5 may be employed. A charcoal diluent at this uppermost activity of 2.5 is considered too sluggish and too slow to efficiently catalyze the desired reaction. However, the active charcoal catalyst with an activity above 3.1 and the diluent having an activity from 0 to 2.5 will provide an acceptable composition so long as the overall average activity of the catalyst composition is within acceptable levels as will be further discussed below.

As employed in the present context a catalyst composition refers to an intimate mixture of the active carbon catalyst having an activity of at least about 3.1 and a diluent having a maximum activity as high as about 2.5 with the resulting composition having a final activity between 1.8 and 3.0. A desirable activity range is between 2.0 and 2.5. This final average activity is determined on the basis of the formula:

$$\frac{\text{Activity of active carbon catalyst} \times \text{weight} + \text{activity of diluent} \times \text{weight}}{\text{Weight of active carbon catalyst} + \text{weight of diluent}}$$

As employed previously the activity for accuracy purposes is based on a 70% efficiency.

The above catalyst composition is required to be an intimate mixture which is denoted to mean that a degree of homogeniety of the active carbon and diluent is present but absolute uniformity need not be present. Since this mixture of particles or granules may be of different particle size, an absolute uniform mixture will ordinarily not be present. However, the composition will have mixing of the particles of the active carbon catalyst and diluent taking place prior to usage.

The use of the mixture of the diluent and active charcoal catalyst having an activity of between about 1.8 and 3.0 and more desirably 2.0 to 2.5 with an option level about 2.25 is considered to obtain the final effects:

1. Local rates of trimerization are decreased.
2. Local rates of heat generation are decreased.
3. Extent of accumulation of heat is decreased.
4. Overall efficiency of trimerization of 97–98% is maintained.

From the above effects it may be readily seen that heat transfer from the heat generated by unit area of the catalyst bed will be less and therefore the heat buildup and local hot spot formation will be diminished. Yet the present catalyst composition permits the relatively efficient trimerization to take place adjacent to the region containing the active carbon catalyst having an activity of at least 3.1. The solid diluent allows heat transfer and allows heat to be dissipated. By decreasing temperature and by decreasing hot spots, overall useful life of the active carbon catalyst is at least doubled.

For example, to illustrate this reduction in elevated temperature and hot spots an active carbon catalyst having an activity of about 3.3 F/W hr.$^{-1}$ is mixed with an inert material such as quartz having an activity of essentially zero at a ratio of about 1 part of the active material to about 0.5 part of the solid diluent. The temperature in a 2" diameter, 20 ft. long tubular reactor is reduced from 490° C. to about 420° C. This comparison is based upon equal quantities of active carbon catalyst and equal flow rates of cyanogen chloride.

As examples of the active catalyst which can be combined with a solid diluent are such catalysts as PCB manufactured by the Pittsburgh Carbon Company of Pittsburgh, Pa. and CXAC, JXAC and CXAL manufactured by the Union Carbide Company.

As examples of the solid diluent material which can be used in the method of this invention are SXAC, an activated charcoal catalyst having an activity of about 2.3 F/W hr.$^{-1}$ as defined herein, manufactured by the Union Carbide Company, quartz chips, graphite chips, porcelain chips, and the like.

By use of a catalyst system in the ratio described in the present invention, the catalyst life of the active carbon catalyst has been substantially increased that is, the life of the active carbon catalyst is doubled or more. The active catalyst can be effectively used for a period of up to about six months.

For example, in plant use of conventional activated carbon catalyst, SCAC in plant use at a conventional temperature of 500° C., usage of 30 to 40 days is considered to be an optimum life. With the same carbon catalyst CXAC but employing a diluent so that the final catalyst composition activity is initially about 2.25, a plant life of at least 2–3 months is obtained with a conventional operating temperature of 400–420° C. utilizing essentially the same plant conditions of operation.

The present invention is further illustrated by the following examples which are not to be considered limiting.

Example 1

A mixed catalyst that is, a 50–50 mixture containing 2.5 g. CXAC and 2.5 g. of porcelain chips was employed as a catalyst in the production of cyanuric chloride from cyanogen chloride in a 2" dia., 20' long tubular reactor. A temperature of 470° C. was noted. However, when 2.5 g. of the CXAC catalyst alone was used, there was a measured temperature of 502° C.

Example 2

The procedure used in Example 1 was followed except for the use of a mixed catalyst containing quartz chips and CXAC in a 50–50 mixture. There was a substantial lowering in the temperature when the mixture was used as compared with the use of the CXAC catalyst alone.

Example 3

The procedure used in Example 1 was followed except for the use of graphite chips in a 50–50 mixture with CXAC catalyst. Here, too, there was a substantial lowering in the temperature when the mixture was used as compared with the use of the CXAC catalyst alone.

Example 4

The procedure of Example 1 was followed except for the use of a 40–60 mixture of CXAC catalyst and quartz chips. It was noted that the temperature was lowered to 420° C. when the catalyst and quartz mixture was used as compared with the use of the catalyst alone where the temperature was noted to be 502° C.

Example 5

The procedure of Example 1 was followed except for the use of a 30–70 catalyst mixture. Substantially similar results were obtained.

What is claimed is:

1. A catalyst composition useful for the production of cyanuric chloride from cyanogen chloride in the vapor phase said composition being an intimate mixture of an activated carbon catalyst having an activity of above 3.1 and a solid diluent having an activity below 2.5 wherein the average activity of the composition is between 1.8 and 3.0.

2. The catalyst composition of claim 1 wherein the average activity of the composition is between about 2.0 and 2.5.

3. The composition of claim 1 wherein said diluent is chosen from the group consisting of quartz, graphite, porcelain, and mixtures thereof.

References Cited

UNITED STATES PATENTS

| | | | |
|---|---|---|---|
| 3,018,288 | 1/1962 | Tokime et al. | 252—444 XR |
| 3,312,697 | 4/1967 | Riethmann et al. | 252—446 XR |
| 3,524,852 | 8/1970 | Gruber et al. | 260—248 C |

PATRICK P. GARVIN, Primary Examiner

U.S. Cl. X.R.

252—444; 260—248 C